United States Patent Office 2,921,951
Patented Jan. 19, 1960

2,921,951

PREPARATION OF ALKYLFLUOSILANES BY THE REACTION OF FLUOSILICATES WITH ALUMINUM TRIALKYLS

Herbert Jenkner, Hannover-Wülfel, Germany, assignor to Kali-Chemie Aktiengesellschaft, Hannover, Germany No Drawing. Application December 12, 1957
Serial No. 702,274

Claims priority, application Germany June 11, 1953

4 Claims. (Cl. 260—448.2)

The invention relates to the preparation of alkylfluosilanes and alkyl silanes, and this application is a continuation-in-part of my copending application, Serial No. 434,063, for a process for manufacturing organo-silicon compounds, filed June 2, 1954, now abandoned.

In said application, I have disclosed the reaction of silicon tetrafluoride and organo-fluosilanes at elevated temperatures with aluminum alkyls or etherates thereof, whereby the fluorine atoms of the silicon-fluorine compounds are exchanged against alkyl groups of the aluminum alkyl with formation of alkyl fluosilanes and alkyl silanes. As organic groups of the organo-fluosilanes, any monovalent hydrocarbon radical may be employed; for reasons of commercial availability, the lower alkylfluosilanes will be generally used as starting materials. For similar reasons, the lower aluminum alkyls, such as trimethyl and triethyl aluminum, are preferably employed. Instead of the aluminum trialkyls, also the dialkyl aluminum monofluorides may be employed.

The best temperature range is about 140 to 260° C. Under favorable conditions, the reaction may start already at lower temperatures, such as at 100° C. If a solvent like ether is used, the temperature may be gradually raised to 260° C., whereby said solvent is distilled off. Temperatures up to about 300° C. may also be used, though at high temperatures the alkylation degree of the silane may be reduced, particularly when the alkylation is carried out with higher aluminum alkyls.

The reaction is carried out under atmospheric pressure, but superatmospheric or reduced pressures may also be applied.

A preferred embodiment of the invention consists in using silicon fluoride in the form of a salt of fluosilicic acid. Suitable salts are, for instance, the anhydrous alkali metal salts such as $K_2SiF_6$ and $Na_2SiF_6$, and it is of particulad advantage to employ freshly prepared salts. Also, the salts of the alkaline earth metals, such as $BaSiF_6$, may be used.

As aluminum alkyls, I use trimethyl or triethyl aluminum; higher alkyls are less useful because they increase in the reaction product the ratio of silicon-hydrogen compounds, wherein fluorine has been replaced by hydrogen. The formation of silicon-hydrogen compounds is negligible when trimethyl aluminum and low temperatures are used; small amounts, in the order of magnitude of about 2–3%, are formed with triethyl aluminum in the optimum temperature range of 210–230° C., and these amounts increase with increasing temperature.

In the process, a mixture of alkyl silane and fluorinated alkyl silanes is obtained, which is readily fractionated because of the great difference in the boiling points, which is, in the fluorine series, much greater than in the corresponding chlorine series.

The boiling points of the fluorides of the ethyl silane group, for instance, are as follows:

$SiF_3(C_2H_5)$ ---------------------- −4° C.
$SiF_2(C_2H_5)_2$ -------------------- +62° C.
$SiF(C_2H_5)_3$ --------------------- 110° C.
$Si(C_2H_5)_4$ ---------------------- 151° C.

In comparison therewith, the boiling points of the corresponding chlorine series are:

$SiCl_3C_2H_5$ ---------------------- 98° C.
$SiCl_2(C_2H_5)_2$ ------------------ 129° C.
$SiCl(C_2H_5)_3$ -------------------- 143° C.
$Si(C_2H_5)_4$ ---------------------- 151° C.

It will be noted that the boiling point difference between $SiF_3(C_2H_5)$ and $SiF(C_2H_5)_3$ is 114° C., where the same difference between the corresponding chlorides is only 55° C. In the case of the methyl compounds, the differences are 46.4° C. and 8.4° C., respectively.

A further advantage of the fluorides over the chlorides is that in the methylchlorsilane synthesis, the generation of $SiCl_4$ can hardly be avoided, which has almost the same boiling point (56° C.) as $(CH_3)_3SiCl$ (57.3° C.). $SiF_4$, if it is formed at all in the alkylation of the fluosilicates, does not interfere with the recovery of the fluosilanes, because it sublimes already at a temperature of −96° C.

On heating, for instance, sodium fluosilicate with triethyl aluminum, the following reactions take place:

(1) $3Na_2SiF_6 + Al(C_2H_5)_3 \rightarrow 3SiF_3(C_2H_5) + AlF_3 + 6NaF$
(2) $3Na_2SiF_6 + 2Al(C_2H_5)_3$
$\rightarrow 3SiF_2(C_2H_5)_2 + 2AlF_3 + 6NaF$
(3) $3Na_2SiF_6 + 3Al(C_2H_5)_3$
$\rightarrow 3SiF(C_2H_5)_3 + 3AlF_3 + 6NaF$
(4) $3Na_2SiF_6 + 4Al(C_2H_5)_3$
$\rightarrow 3Si(C_2H_5)_4 + 4AlF_3 + 6NaF$.

All these reactions take place concurrently, but it is possible to favor one reaction over the others by selecting the ratio of the reactants in accordance with the corresponding equation. As dihalodialkyl silanes are preferred starting materials for the manufacture of silicones, the reactants of the invention will be preferably reacted in amounts corresponding to Equation 2 so as to obtain an optimum yield of the difluoro compound.

I have found that the formation of the difluoro compounds is further increased when the reaction is carried out in an organic diluent which acts as suspending medium for the fluosilicic salt and as diluent or solvent for the aluminum alkyl. Any organic liquid is suitable which does not react with the reactants and reaction products and has a boiling point at least about 40° C. above the boiling point of the aluminum alkyl, such as hydrocarbons not containing olefinic double bonds and boiling between about 180° C. and 450° C. Such hydrocarbons are, for instance, paraffins having at least 9 C atoms, methyl naphthaline, and particularly high boiling mineral oils. Also tetra-alkyl silanes of a suitable boiling range may be employed.

In such suspension, which can be easily stirred from the start to the completion of the reaction, the aluminum alkyl readily reacts completely with the fluosilicate.

The diluent is preferably employed in an amount by weight approximately corresponding to the amount of the reacting fluosilicate; however, also smaller amounts (about 50 to 75%) may already exert a favorable effect.

A preferred embodiment of the invention consists in heating, with vigorous stirring, a suspension of sodium fluosilicate in a mineral oil at 200–280° C. and then adding slowly the aluminum alkyl. The formed mixture of alkyl fluosilanes and tetra-alkyl silane distills off continuously, conforming to the rate of addition of the aluminum alkyl. It is of advantage to introduce the aluminum alkyl below the surface of the suspension.

It is also possible to add first the aluminum alkyl to the heated diluent and to introduce then the fluosilicate.

After completion of the reaction, the diluent can be separated from the NaF—AlF$_3$ residue by distillation, centrifugation, decantation or filtration.

If an expensive diluent has been used which is to be recovered as completely as possible, the AlF$_3$–NaF-diluent residue may be mixed with a low boiling solvent, such as hexane or the like; after separation of the solid phase from the diluent-solvent mixture, the low boiling solvent is readily distilled off from the diluent, such as mineral oil, tetrapropyl silane, and the like, which diluent is then ready to be used again in a subsequent operation.

The NaF–AlF$_3$ residue may be processed to form Na$_2$SiF$_6$ by admixing it with SiO$_2$ and heating it at 1,000–1,200° C. In this way, SiF$_4$ is generated, which is reacted with NaCl to form Na$_2$SiF$_6$. Another way to produce SiF$_4$ from the NaF–AlF$_3$ residue consists in the reaction with SiO$_2$ and concentrated H$_2$SO$_4$ or SO$_3$ at 350 to 450° C.

In the hydrolysis of the alkylfluosilanes to silicones, HF or alkali metal or ammonium fluoride is obtained, which too may be converted with SiO$_2$ and H$_2$SO$_4$ into SiF$_4$. In this manner, a complete fluorine cycle is accomplished, so that only SiO$_2$ and AlR$_3$ are consumed for the manufacture of alkyl polysiloxanes.

The following examples illustrate the invention. It will be noted that in the examples where the reaction was carried out in suspension, the ratio of difluoalkyl silane in the reaction was much higher than in the examples, where no diluent was used. All parts are given by weight.

Example 1

A mixture of 228 parts (2 moles) of triethyl aluminum and 564 parts (3 moles) of Na$_2$SiF$_6$ was heated on an oil bath at 200–250° C. 256 parts of a mixture were obtained which consisted of 18% SiF$_3$C$_2$H$_5$
42% SiF$_2$(C$_2$H$_5$)$_2$
15% SiF (C$_2$H$_5$)$_3$
25% Si (C$_2$H$_5$)$_4$

Example 2

188 parts (1 mole) of Na$_2$SiF$_6$ were suspended in 300 parts of a mineral oil having a low content of sulfur and olefins and boiling at about 180–240° C. under a pressure of 0.1 mm. (as available in commerce, for instance under the trade names Bayol 85 or Viscobiloil SERA 4), and heated at about 230° C., under stirring. Then 76.6 parts of Al(C$_2$H$_5$)$_3$ were slowly introduced dropwise into the suspension.

The reaction started at once, whereby the obtained ethyl fluosilane-tetraethyl silane mixture distilled off. 123.5 parts of such mixture were obtained which was composed of 26 parts=23.1% SiF$_3$(C$_2$H$_5$)
75 parts=60.7% SiF$_2$(C$_2$H$_5$)$_2$
10.6 parts= 8.6% SiF (C$_2$H$_5$)$_3$
9.4 parts= 7.6% Si (C$_2$H$_5$)$_4$ The yield, calculated on triethyl aluminum, was 97%. The reaction product contained about 3–4% of partially ethylated silanes (SiH (C$_2$H$_5$)$_3$, etc.). The ratio of such partially ethylated silanes over the coresponding fluorinated silanes increases with increasing reaction temperature. At a temperature of 280° C., for instance, their amount increases to about 15 to 20% of the total mixture.

Instead of triethyl aluminum, trimethyl aluminum may be used, whereby similar yields are obtained. Similarly, the trimethyl or triethyl aluminum may be replaced by dimethyl or diethyl aluminum fluoride.

Example 3

In the same manner as set forth in Example 1, 423 parts of Na$_2$SiF$_6$ were heated with 508 parts of triethyl aluminum ethyl etherate. There were obtained:

10 parts= 3.8% SiF$_3$(C$_2$H$_5$)
61 parts=23.1% SiF$_2$(C$_2$H$_5$)$_2$
73.6 parts=27.9% SiF (C$_2$H$_5$)$_3$
80.4 parts=30.5% Si (C$_2$H$_5$)$_4$ The total yield, calculated on the sodium fluosilicate, was 79 percent; 6 percent of the triethyl aluminum etherate had not reacted.

Example 4

153.5 parts of Na$_2$SiF$_6$ were suspended in 180 parts of mineral oil ($b_1$=190–210° C.) and heated at 230–235° C. Over a period of 15 hours, 102.4 parts of Al(C$_2$H$_5$)$_3$·O(C$_2$H$_5$)$_2$ were added to the suspension. By fractionated distillation there were obtained 11 parts of SiF$_3$(C$_2$H$_5$), 48 parts (=59.2%) of SiF$_2$(C$_2$H$_5$)$_2$, 14 parts of SiF(C$_2$H$_5$)$_3$, and 8 parts of Si(C$_2$H$_5$)$_4$.

Example 5

598 parts of triethyl aluminum-ethyl etherate were mixed with 1150 parts of sodium fluosilicate and slowly heated on an oil bath to 220° C., whereby the ethyl ether distilled off.

The reaction took place at about 210–220° C. and was terminated after 5 minutes.

The following compounds were obtained:

SiF$_3$(C$_2$H$_5$) 53 parts=12.8%
SiF$_2$(C$_2$H$_5$)$_2$ 171 parts=41.2%
SiF (C$_2$H$_5$)$_3$ 63 parts=15.1%
Si (C$_2$H$_5$)$_4$ 82 parts=19.7%

The total yield, calculated on Na$_2$SiF$_6$, was 86%.

Example 6

144 parts of trimethyl aluminum were passed into a suspension of 570 parts sodium fluosilicate in 500 parts of a high boiling mineral oil at a reaction temperature of 200–240° C. with stirring. The reaction was carried out in a closed reactor, whereby the formed mixture of methylfluosilanes was released at atmospheric pressure from a reflux cooler. The conversion, calculated on trimethyl aluminum, was quantitative. The content of dimethyl difluosilane in the mixture of methyl fluosilanes was 62 percent.

If the reaction is not carried out in a closed vessel, it is of advantage to use trimethyl aluminum in an excess of about 20–40 percent, because port of the trimethyl aluminum distills off with the mixture of the methyl fluosilanes. After separation from said mixture, the recovered trimethyl aluminum may be again used for the reaction.

Example 7

A batch of triethyl aluminum ethyl ether was heated to about 140–230° C., and a current of dry oxygen-free SiF$_4$ was passed into said batch, whereby the gas was introduced below the surface of the liquid. Immediate reaction took place, and ether and a mixture of ethylfluosilanes and ethyl silane distilled off. Said mixture contained more than 50 percent of SiF$_3$ C$_2$H$_5$.

If the reaction is carried out in an autoclave with an excess of about 50 percent of triethyl aluminum, almost pure tetraethyl silane is obtained.

In both cases, the conversion of SiF$_4$ is almost quantitative.

I claim:

1. A process for preparing alkylfluosilanes comprising heating a salt of fluosilicic acid selected from the group consisting of alkali metal fluosilicates and alkaline earth metal fluosilicates at a temperature of about 100 to 300°

C. under anhydrous conditions with a lower aluminum trialkyl in an inert liquid organic diluent having a boiling point of at least 40° C. above the boiling point of said aluminum trialkyl and being selected from the group consisting of hydrocarbons not containing olefinic double bonds and tetraalkyl silanes.

2. The process as defined in claim 1, wherein sodium fluosilicate is used.

3. A process for preparing alkyl fluosilanes comprising heating sodium fluosilicate in a mineral oil, which is substantially free from sulfur and oxygen-containing compounds and has a boiling point of at least 180° C. at a temperature of about 140 to 300° C. and at least about 40° C. below the boiling temperature of said mineral oil, with an organo-aluminum compound selected from the group consisting of $$AlR_3 \text{ and } AlR_3 \cdot (C_2H_5)_2O$$

wherein R is a member of the group consisting of methyl and ethyl.

4. The process as defined in claim 3, wherein about 3 moles of sodium fluosilicate are reacted with 2 moles of the organo-aluminum compound.

References Cited in the file of this patent

UNITED STATES PATENTS

| | | |
|---|---|---|
| 2,436,777 | Pletcher et al. | Feb. 24, 1948 |
| 2,762,824 | Brown | Sept. 11, 1956 |

FOREIGN PATENTS

| | | |
|---|---|---|
| 1,038,184 | France | May 6, 1953 |
| K26,023 | Germany | Sept. 27, 1956 |

OTHER REFERENCES

Soshestvenskaya: "Jour. Gen. Chem." (USSR), vol. 10 (1940), pp. 1689–93.